United States Patent Office 3,055,921
Patented Sept. 25, 1962

3,055,921
17-CYANO-17-OXY-STEROIDS AND 17-AMINO-METHYL-17-OXY-STEROIDS
Raymond O. Clinton, North Greenbush Township, Rensselaer County, N.Y., assignor to Sterling Drug Inc., New York, N.Y., a corporation of Delaware
No Drawing. Original application Jan. 5, 1956, Ser. No. 557,433, now Patent No. 2,880,233, dated Mar. 31, 1959. Divided and this application Sept. 13, 1956, Ser. No. 612,083
9 Claims. (Cl. 260—397.45)

This invention relates to intermediates in the preparation of new compounds of the perhydrochrysene series (D-homosteroids) and related series. These compounds as will appear are useful as intermediates in the preparation of substances having sex hormone and cortical hormone activity.

More particularly this invention relates to intermediates in the preparation of D-homosteroid derivatives having an oxygen-containing functional group in each of the 3-, 11- and 17a-positions as represented by the following general formula:

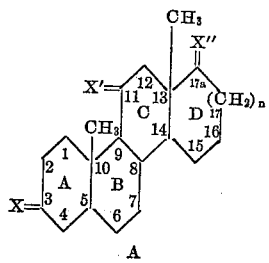

A wherein X, X' and X" are divalent groups selected from the class consisting of

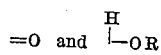

wherein R is selected from the group consisting of hydrogen and acyl groups, $n$ is an integer from 1 to 2, and the corresponding compounds where X is O having a double bond in the 4,5-position.

In the above general formula, when R is an acyl group, the nature of the acyl group is not critical as it is used only as a blocking or protecting means for the hydroxy group. The preferred types of acyl groups are carboxylic acyl groups having a molecular weight less than about 250, and of these a preferred class comprises those derived from lower fatty acids, including lower-alkanoic acids, lower-aliphatic dicarboxylic acids, and monocarbocyclic aromatic carboxylic acids, optionally substituted by one or more inert groups such as nitro, alkyl, alkoxy and halogen. Thus R in the above definition can be lower-alkanoyl, such as formyl, acetyl, propionyl, butyryl, valeryl, isovaleryl, capropyl, etc. wherein the alkanoyl group has from 1 to about 6 carbon atoms; carboxy-lower-alkanoyl, such as hemi-malonyl and hemi-succinyl; and monocarbocyclic aroyl, such as benzoyl, p-toluyl and p-nitrobenzoyl.

In the above general Formula A, the numbering of the ring system is given for the case where $n$ is 1. In the case where $n$ is 2, ring D is seven-membered and is numbered, counterclockwise, 13, 14, 15, 16, 17, 17a, 17b, the substituent X" being attached to the 17b position.

The compounds of Formula A are prepared by way of a ring enlargement of steroids. The 17-ketosteroid, depicted at the beginning of the flow sheet below, where R is hydrogen or acyl and X' has the same meaning given above, reacts with hydrogen cyanide to produce a mixture of stereoisomeric cyanohydrins (I), which constitute the compounds of the present invention. The latter mixture is then catalytically hydrogenated to the corresponding 17-aminomethyl-17-hydroxy compounds which need not be isolated but can be converted directly to the desired perhydrochrysene derivative (II) by treating the unpurified intermediate with nitrous acid.

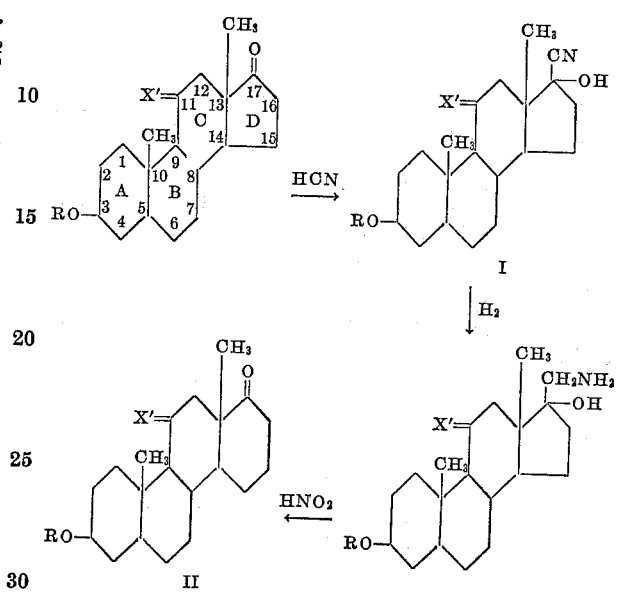

The ring enlargement process can be repeated, starting with a compound of Formula II, and a compound having a seven-membered ring D ($n=2$ in the general Formula A above) is obtained. This process leads directly to one of the following species:

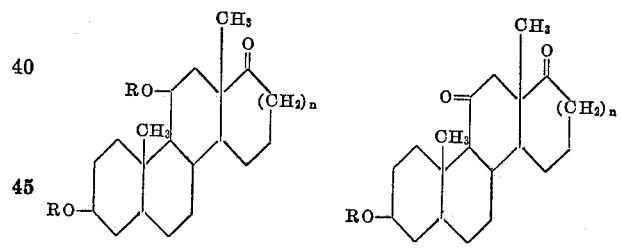

The RO groups can be sterically oriented in either the α- or β-positions, and the compounds can belong either to the normal series (A/B cis) or the allo series (A/B trans).

A preferred starting material comprises 3α-acetoxyetiocholane-11,17-dione, which when carried through the above process produces 3α-acetoxy-D-homoetiocholane-11,17α-dione. The latter is readily saponified to give D-homoetiocholan-3α-ol-11,17a-dione.

The mixture of epimeric 17-ketoetiocholane cyanohydrins can readily be separated if desired. The 17β-hydroxy-17α-cyano isomer is much more easily acetylated than the 17α-hydroxy-17β-cyano isomer. Thus when the 3α - acetoxy - 17 - cyanoetiocholan - 17 - ol - 11 - one epimeric mixture is acetylated with acetic anhydride and pyridine under mild conditions, 3α,17β-diacetoxy-17α-cyanoetiocholan-11-one can be separated by fractional crystallization. 3α - acetoxy - 17β - cyanoetiocholan-17α-ol-11-one can then be isolated from the mother liquors.

D-homoetiocholane-11,17a-dion-3α-ol and its 3-acyl derivatives are readily converted to other species. For example, D-homoetiocholan-3α-ol-11,17a-dione is oxidized with chromic acid or an N-haloamide, or by the Oppenauer method to D-homoetiocholane-3,11,17a-trione (III).

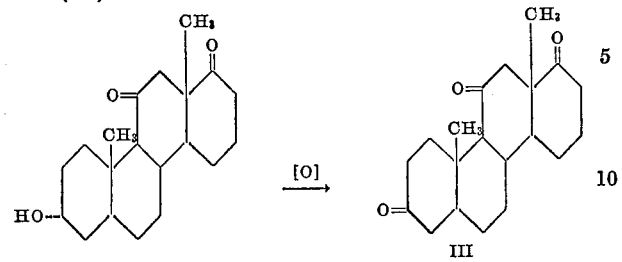

The 11-keto group of D-homoetiocholan-3α-ol-11,17a-dione is more hindered and less readily reduced than the 17a-keto group. Consequently this compound or its esters can be selectively reduced to D-homoetiocholane-3α,17a-diol-11-one or its esters by the use of mild reducing conditions as with sodium borohydride. Both the 17aα and 17aβ isomers (IV and V) are obtained, with the 17aβ form predominating. Conformational analysis predicts the preferential formation of the 17aβ form, and the configuration has been assigned on this basis.

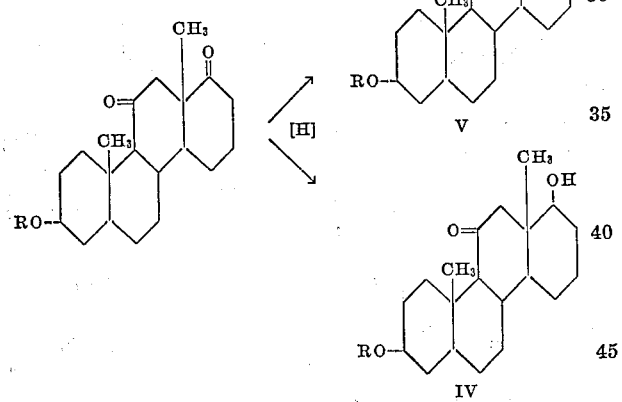

The 11-keto group of D-homoetiocholane-3α,17a-diol-11-one or its esters can then be reduced to an 11-hydroxy group under stronger reducing conditions, as with lithium aluminum hydride to produce D-homoetiocholane-3α,11β,17a-triol or esters thereof (VI). Reduction with an alkali metal-lower-alkanol medium produces a compound with an 11α-hydroxy group, e.g., D-homoetiocholane-3α,11α,17a-triol. The orientation of the 11-hydroxy group is assigned on the basis of ease of esterification. The 11β-hydroxy group cannot be acetylated by conventional methods, whereas the 11α-hydroxy group can be acetylated readily.

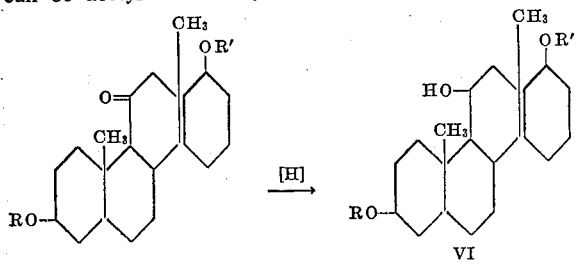

Alternatively, both keto groups of D-homoetiocholan-3α-ol-11,17a-dione can be reduced to hydroxy groups, as by the action of excess lithium aluminum hydride, to give directly D-hometiocholane-3α,11β,17a-triol.

D-homoetiocholane-3α,17a-diol-11-one can be converted to D-homoetiocholan-17a-ol-3,11-dione by oxidation of the 3α-hydroxy group while the 17a-hydroxy group is protected by esterification. This can conveniently be accomplished as follows: 3α-acetoxy-D-homoetiocholan-17a-ol-11-one with benzoyl chloride gives the 17a-benzoate (VII). Selective saponification of the latter gives 17a-benzoyloxy-D-homoetiocholan-3α-ol-11-one (VIII), which is then oxidized with chromic oxide or an N-bromoamide, or by the Oppenauer method to 17a-benzoyloxy-D-homoetiocholane-3,11-dione (IX). A final saponification then gives D-homoetiocholan-17a-ol-3,11-dione (X).

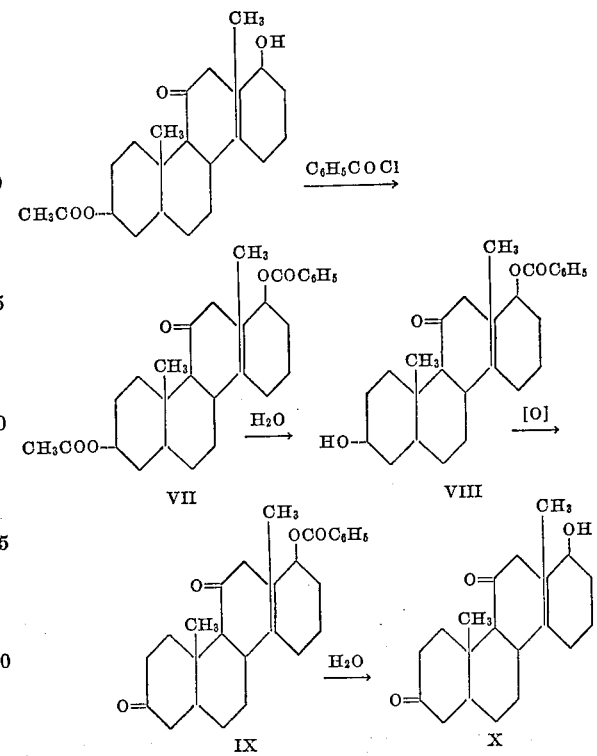

In species containing two or more keto groups, fewer than all of the keto groups can be reduced to hydroxy groups by protection of one or more of the keto groups by conversion to a ketal. For example, D-homoetiocholan-3α-ol-11,17a-dione can be converted to the 17a-ethylene glycol ketal by treatment with ethylene glycol in the presence of an acidic substance, e.g., hydrogen chloride or p-toluenesulfonic acid under anhydrous conditions. The 11-keto group, being more hindered, does not form a ketal, and therefore can be subsequently reduced with lithium aluminum hydride to an 11β-hydroxy group. The 17a-ketal group can then be cleaved with aqueous acid and D-homoetiocholane-3α,11β-diol-17a-one results (XIII). Alternatively the keto group can be protected as the hemithioketal (XI). In this case, β-mercaptoethanol instead of ethylene glycol is employed and ketalization takes place in the presence of zinc chloride and sodium sulfate. The ketone can be regenerated by treatment of the hemithioketal with Raney nickel.

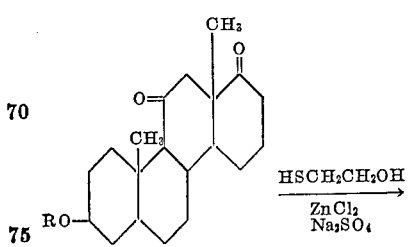

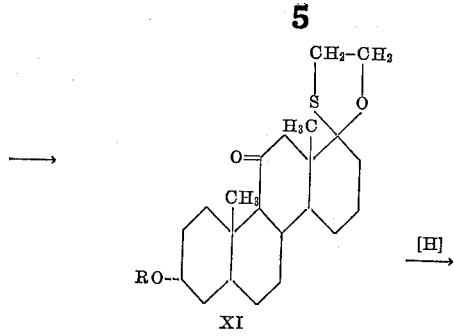

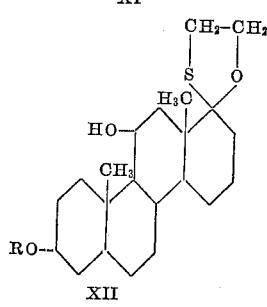

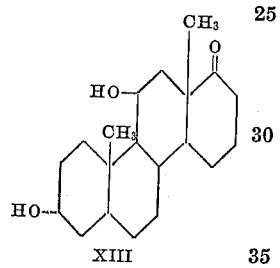

Similarly, both the 3- and 17a-keto groups of D-homoetiocholane-3,11,17a-trione can be ketalized and the 11-keto group reduced to a hydroxy group giving, after cleavage of the ketal groups, D-homoetiocholan-11-ol-3,17a-dione (XVI).

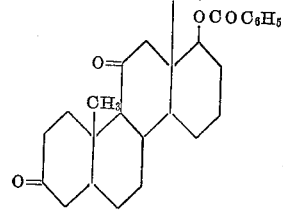

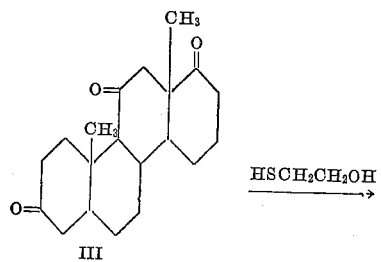

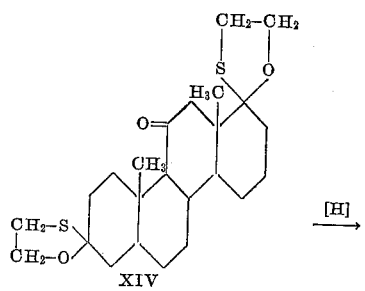

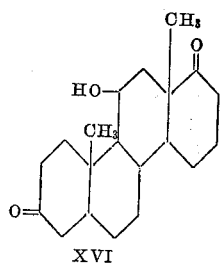

In a like manner, 17a-benzoyloxy-D-homoetiocholan-3,11-dione can be converted to its 3-(β-mercaptoethanol) ketal (XVII). The 11-keto group can then be reduced to hydroxy, and cleavage of the ketal group and saponification of the benzoyloxy group produces D-homoetiocholane-11,17a-diol-3-one (XIX).

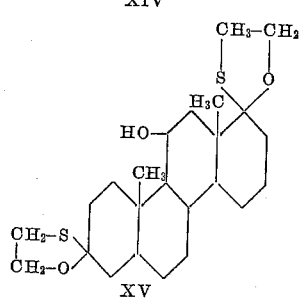

The compounds of the D-homoetiocholane series (normal series, A/B cis) are readily converted to compounds of the D-homoandrostane series (allo series, A/B trans). This is accomplished starting with the compounds of the general formula

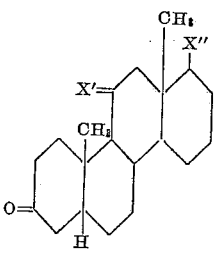

wherein X' is =O and X" is preferably $$\overset{H}{\underset{|}{\text{--}}}\text{OR}$$

where R is hydrogen or acyl. A double bond is introduced in the 4,5-position by halogenation in the 4-position followed by dehydrohalogenation. Subsequent catalytic reduction of the double bond produces a mixture of the starting D-homoetiocholane derivative and the isomeric D-homoandrostane (D-homoetioallocholane) derivative. The latter can be isolated and carried through the numerous reactions described above for the D-homoetiocholane series.

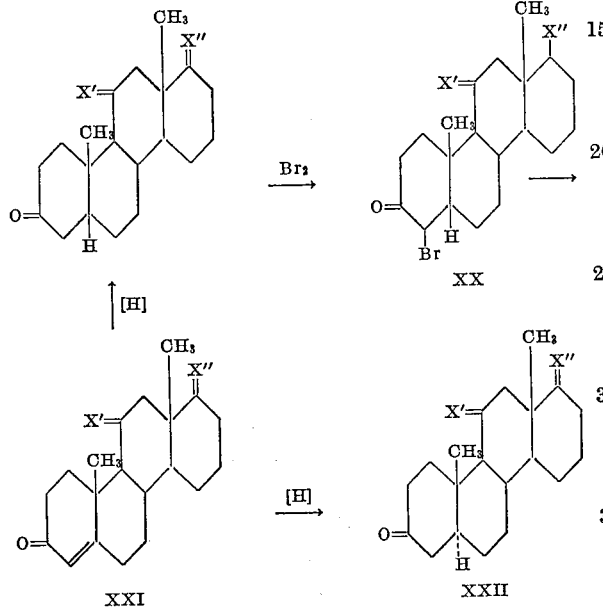

All of the transformations described hereinbefore can be carried out on the compounds of general formula A where n is 2 in an entirely analogous fashion to give the corresponding compounds having a seven-membered ring D.

The following examples will further illustrate the invention.

EXAMPLE 1

(a) *17-Cyanoetiocholane-3α,17-Diol-11-One*

(I; R is H, X' is O)

A solution of 15.7 g. of potassium cyanide in 24 ml. of water was added to a solution of 9.0 g. of etiocholan-3α-ol-11,17-dione in 576 ml. of absolute ethanol at 3° C. Acetic acid (16.9 ml.) was then added dropwise, and the solution was allowed to warm to room temperature with stirring and kept at that temperature for about twenty-three hours. The reaction mixture was then poured into 2 liters of water and the organic material was extracted with three 500 cc. portions of ethyl acetate. The ethyl acetate extracts were washed twice with 200 cc. of water, once with 500 cc. of saturated sodium chloride solution, dried over anhydrous sodium sulfate, filtered and concentrated in vacuo. The residue was crystallized from ethyl acetate to give a first crop of 3.51 g., M.P. 203.5–204.5° C., and a second crop of 0.825 g., M.P. 181–183° C. of a mixture of epimeric 17-cyanoetiocholane-3α,17-diol-11-ones.

(b) *17-Aminomethyletiocholane-3α,17-Diol-11-One*

A solution of 3.51 g. of a mixture of epimeric 17-cyanoetiocholane-3α,17-diol-11-ones, M.P. 203.5–204.5° C., in 200 cc. of acetic acid was hydrogenated using 1.0 g. of Adams platinum oxide catalyst. The pressure of the hydrogen employed was about 40 lbs. per sq. inch and hydrogenation was complete in about two hours. The spent catalyst was removed by filtration and the filtrate concentrated in vacuo. The residue was dissolved in methanol and the solution again concentrated in vacuo, and water was added to the residue. The material which failed to dissolve was removed by filtration and the aqueous solution containing the acetate salt of 17-aminomethyletiocholane-3α,17-diol-11-one was used directly in the following ring enlargement reaction.

(c) *D-Homoetiocholan-3α-Ol-11,17a-Dione*

(II; R is H, X' is O)

To the aqueous solution of 17-aminomethyletiocholane-3α,17-diol-11-one acetate salt prepared as described above was added 2 ml. of glacial acetic acid and 1 g. of sodium nitrite in 5 ml. of water. The reaction mixture was allowed to stand for twenty hours, and the organic material was extracted with 25 cc. of chloroform and 75 cc. of ether. The organic extracts were washed twice with 50 ml. of saturated sodium chloride solution, dried over sodium sulfate, filtered and concentrated to dryness in vacuo. The residue was triturated with ether to give 0.533 g. of crystalline material, M.P. 173–187° C. Recrystallization from a benzene-petroleum ether (Skellysolve B) mixture gave D-homoetiocholan-3α-ol-11,17a-dione, M.P. 193–198° C.

*Analysis.*—Calcd. for $C_{20}H_{30}O_3$: C, 75.43; H, 9.50. Found: C, 75.40; H, 9.20.

EXAMPLE 2

(a) *3α-Acetoxy-17-Cyanoetiocholan-17-Ol-11-One*

(I; R is Acetyl, X' is O)

A solution of about 70 g. (0.2 mole) of 3α-acetoxyetiocholane-11,17-dione in 1500 ml. of 95% alcohol was cooled to about 0° C., and 390 g. (6.0 moles) of potassium cyanide was added followed by 277 ml. (2.88 g., 4.90 moles) of glacial acetic acid added dropwise over a period of forty-five minutes. The reaction mixture was then stirred for one hour at about 0° C. and at room temperature for about three hours. After standing for fifteen hours the reaction mixture was poured into 8 liters of water containing 150 ml. of glacial acetic acid. The resulting solid was collected by filtration, washed with water, dissolved in 2 liters of hot ethyl acetate, and the ethyl acetate solution was washed with water, dried over anhydrous sodium sulfate, decolorized with activated charcoal and concentrated to give 68.9 g. (92.5%) of a mixture of epimeric 3α-acetoxy-17-cyanoetiocholan-17-ol-11-ones, M.P. 217–220° C. (dec.).

(b) *3α-Acetoxy-17-Aminomethyletiocholan-17-Ol-11-One*

A mixture of 70 g. of a mixture of epimeric 3α-acetoxy-17-cyanoetiocholan-17-ol-11-ones, 5 g. of platinum oxide catalyst and 1500 ml. of glacial acetic acid was hydrogenated at elevated pressure. After two and one-half hours the pressure dropped from 100 lbs. per sq. inch to 45 lbs. per sq. inch and the temperature ranged from 25 to 33° C. The spent catalyst was removed by filtration and the filtrate concentrated to about 100–150 ml., diluted to a volume of 1 liter with water and again filtered. This solution, containing 3α-acetoxy-17-aminomethyletiocholan-17-ol-11-one, was used directly in the following ring enlargement reaction.

(c) *3α-Acetoxy-D-Homoetiocholane-11,17a-Dione*

(II; R is Acetyl, X' is O)

The dilute acetic acid solution of the mixture of epimeric 3α-acetoxy-17-aminomethyletiocholan-17-ol-11-ones, prepared as described above, was added to 800 g. of ice, and 25 g. of sodium nitrite in 75 cc. of water was added all at once. The reaction mixture was stirred occasionally and allowed to stand for about fifteen hours. The solid which separated was collected by filtration, washed with water, dried, stirred with 400 cc. of boiling methanol, cooled in an ice bath and again collected by filtration. The product was recrystallized twice from methanol giving 41.5 g. of 3α-acetoxy-D-homoetiocholane-11,17a-dione, M.P. 171–171.5° C. (corr.), $$[\alpha]_D^{25} = +22.3°$$

(1% in acetone).

*Analysis.*—Calcd. for $C_{22}H_{32}O_4$: C, 73.30; H, 8.95. Found: C, 73.38; H, 8.87.

(d) *D-Homoetiocholan-3α-Ol-11,17a-Dione*

(II; R is H, X′ is O)

A mixture of 3.6 g. of 3α-acetoxy-D-homoetiocholane-11,17a-dione and 1.0 g. of potassium hydroxide in 50 ml. of methyl alcohol was refluxed for one hour. The reaction mixture was poured into 500 ml. of water, and the resulting solid was collected by filtration, dried and recrystallized from dilute methyl alcohol and then from benzene to give D-homoetiocholan-3α-ol-11,17a-dione as long thick needles, M.P. 205.5–207.5° C. (corr.), $$[\alpha]_D^{25} = -7.6°$$

(1% in chloroform), identical with the substance obtained in Example 1, part (c).

*Analysis.*—Calcd. for $C_{20}H_{30}O_3$: C, 75.43; H, 9.50. Found: C, 75.36; H, 9.25.

EXAMPLE 3

(a) *3α,17β-Diacetoxy-17α-Cyanoetiocholan-11-One*

A mixture of 10.0 g. of 3α-acetoxyetiocholane-11,17-dione, M.P. 154–155° C., 60 g. of powdered potassium cyanide and 250 ml. of 95% alcohol was cooled in an ice-salt bath to 0° C. Glacial acetic acid (42.5 ml.) was then added dropwise during a period of thirty minutes with vigorous stirring. The reaction mixture was then stirred for one hour at 0° C. and for two hours at room temperature and then poured into 2 liters of water containing 22 ml. of acetic acid. The organic material was extracted with two portions of 500 ml. each of ethyl acetate, and the ethyl acetate extracts were washed with 1 liter of 5% sodium chloride solution and dried. The ethyl acetate solution was filtered, and the filtrate was concentrated to dryness in vacuo. The residue was dissolved in 20 ml. of acetic anhydride and 40 ml. of pyridine and allowed to stand for six hours at room temperature and then at 0° C. for two days. The mixture was then poured into ice water containing a small amount of sulfuric acid, the organic material was extracted with ether, and the ether extracts were washed with 3% sodium chloride solution and dried over anhydrous sodium sulfate. The ether solution was evaporated to dryness in vacuo and the residue was taken up in 25 ml. of acetone, and this solution was slowly diluted with 55 ml. of petroleum ether (Skellysolve B). The crystalline material thus obtained was collected by filtration and recrystallized from dilute acetone, giving 4.8 g. of white needles, M.P. 178–180° C. When recrystallized first from an ethyl acetate-petroleum ether mixture and then from methanol there was obtained about 2.8 g. of 3α,17β-diacetoxy-17α-cyanoetiocholan-11-one, M.P. 185.5–187.5° C. (corr.), $[\alpha]_D^{25} = +21.0°$ (1% in chloroform); +23.9° (1% in acetone).

*Analysis.*—Calcd. for $C_{24}H_{33}NO_5$: C, 69.21; H, 8.01; N, 3.37. Found: C, 69.48; H, 8.43; N, 3.54.

(b) *3α-Acetoxy-17β-Cyanoetiocholan-17α-Ol-11-One*

The mother liquors from the original 4.8 g. of crude 3α,17β-diacetoxy-17α-cyanoetiocholan-11-one, obtained in part (a) above, were evaporated to dryness giving 7.0 g. of solid material which was triturated at room temperature with 100 ml. of anhydrous ether. The remaining solid material was collected by filtration, washed with 20 ml. of anhydrous ether and dried at 50° C. giving 0.39 g., M.P. 217–222° C. The latter material was combined with material obtained in other runs at the same stage (total weight 6.59 g.) and dissolved in 125 ml. of ethyl acetate. The ethyl acetate solution was treated with activated charcoal, filtered and the filtrate concentrated to a volume of 35 ml. Upon cooling to 0° C. a solid separated which was collected by filtration, washed with ethyl acetate and recrystallized from acetone to give 3α-acetoxy-17β-cyanoetiocholan-17α-ol-11-one, M.P. 224–225° C. (uncorr. when immersed at 218° C.), $[\alpha]_D^{25} = +85.7°$ (1% in acetone); +92.6° (1% in chloroform).

*Analysis.*—Calcd. for $C_{22}H_{31}NO_4$: C, 70.74; H, 8.37; N, 3.75. Found: C, 70.57; H, 8.26; N, 3.74.

(c) *3α,17α-Diacetoxy-17β-Cyanoetiocholan-11-One*

A mixture of 2.7 g. of 3α-acetoxy-17β-cyanoetiocholan-17α-ol-11-one( 20 ml. of pyridine and 40 ml. of acetic anhydride was allowed to stand at room temperature for about fifteen hours. The mixture was then poured into ice water to which 15 ml. of concentrated sulfuric acid had been added. The organic material was extracted with ether and the ether layer was washed with water and saturated sodium bicarbonate solution, dried and concentrated to a volume of about 15 ml. Methyl alcohol (50 ml.) was then added and the solution concentrated to about 15 ml. and cooled. A crystalline precipitate was obtained after cooling for a few hours in the icebox, and this was collected by filtration, washed with methanol and recrystallized from a mixture of ethyl acetate and petroleum ether (Skellysolve B), giving 3α,17α-diacetoxy-17β-cyanoetiocholan-11-one, M.P. 183–188.5° C. (corr.), $[\alpha]_D^{25} = +68.3°$ (1% in chloroform). A mixed melting point with the epimeric 17β-acetoxy-17α-cyano compound (M.P. 183–184° C.), obtained above in part (a), was 145–155° C.

*Analysis.*—Calcd. for $C_{24}H_{33}NO_5$: C, 69.21; H, 8.01; N, 3.37. Found: C, 69.68; H, 8.20; N, 3.43.

EXAMPLE 4

*D-Homoetiocholane-3,11,17a-Trione*

(III)

D-homoetiocholan-3α-ol-11,17a-dione (2.0 g.) was dissolved in 26 ml. of tertiary-butyl alcohol by warming. Water (1.0 ml.) was then added and the mixture was cooled to 10° C. N-bromoacetamide (0.97 g.) was added with stirring and the mixture was kept for five hours at 10° C. and then slowly diluted with 156 ml. of water. The resulting solid which separated was collected by filtration, washed with water and dried giving 1.854 g., M.P. 151–153° C. This product was recrystallized from petroleum ether (Skellysolve B) containing a small amount of ethyl acetate, and again recrystallized from dilute methanol to give a sample of D-homoetiocholane-3,11,17a-trione, M.P. 161–163° C. (corr.), $[\alpha]_D^{25} = +0.8°$ (1% in chloroform).

*Analysis.*—Calcd. for $C_{20}H_{28}O_3$: C, 75.91; H, 8.92. Found: C, 76.07; H, 8.86.

EXAMPLE 5

(a) *3α-Acetoxy-D-Homoetiocholan-17aβ-Ol-11-One*

(IV; R is Acetyl)

A solution of 2.62 g. of powdered sodium borohydride in 25 ml. of water and 50 ml. of dioxane was added dropwise during a period of twenty minutes to a solution of 25.0 g. of 3α-acetoxy-D-homoetiocholane-11,17a-dione (Example 2) in 250 ml. of dioxane. The mixture was stirred for fifteen minutes at room temperature and then heated on a steam bath for thirty minutes at 49–52° C. The mixture was then poured into 2 liters of water, the organic material was extracted with ether, and the ether solution was washed with two portions of 2% sodium chloride solution of 2000 ml. each and finally dried over anhydrous sodium sulfate. The ether solution was concentrated to dryness and the residue was recrystallized from petroleum ether (Skellysolve B) containing a small amount of ethyl acetate giving 21.8 g., M.P. 178–180° C. and 2.0 g., M.P. 158–165° C. of 3α-acetoxy-D-homoetiocholan-17aβ-ol-11-one. Two further recrystallizations from ethyl acetate-petroleum ether gave a sample melting at 185.0–189.0° C. (corr.), $[\alpha]_D^{25}=+73.0°$ (1% in chloroform).

*Analysis.*—Calcd. for $C_{22}H_{34}O_4$: C, 72.87; H, 9.45. Found: C, 73.09; H, 9.52.

(b) *D-Homoetiocholane-3α,17aβ-Diol-11-One*

(IV; R is H)

A sample of about 2.5 g. of 3α-acetoxy-D-homoetiocholan-17aβ-ol-11-one was added to 25 ml. of methyl alcohol containing 1.0 g. of potassium hydroxide and the mixture was refluxed for one hour. The mixture was then poured into 250 ml. of cold water and the solid which separated was collected by filtration, washed with water and dried at 70° C. to give a sample of D-homoetiocholane-3α,17aβ-diol-11-one, M.P. 245–260° C. When recrystallized twice from methanol a sample was obtained melting at 271.5–280.5° C. (corr., immersed at 261° C.), $[\alpha]_D^{25}=+58.6°$ (1% in methanol).

*Analysis.*—Calcd. for $C_{20}H_{32}O_3$: C, 74.95; H, 10.07. Found: C, 74.83; H, 10.09.

(c) *3α-Acetoxy-D-Homoetiocholan-17aα-Ol-11-One*

(V; R is Acetyl)

The combined mother liquors from the preparation of the 3α-acetoxy-D-homoetiocholan-17aβ-ol-11-one of part (a), starting from a total of 50 g. of 3α-acetoxy-D-homoetiocholane-11,17a-dione, were concentrated to dryness. The residue was taken up in 20 ml. of benzene and diluted with 480 ml. of petroleum ether (Skellysolve B). The latter solution was filtered and chromatographed on 200 g. of aluminum oxide (pre-washed with 10 ml. of acetic acid in 250 ml. of ethyl acetate, twice with 250 ml. of ethyl acetate and three times with 250 ml. of petroleum ether). The column was then eluted with 500 ml. portions of petroleum ether-benzene mixtures of gradually increasing proportion of benzene. The eluates containing 60–80% of benzene when evaporated to dryness provided crystalline material with M.P. about 110–122° C. This solid material was then recrystallized first from an ethyl acetate-petroleum ether mixture and then from higher boiling petroleum ether (Skellysolve C) giving 3α-acetoxy-D-homoetiocholan-17aα-ol-11-one, isomeric with the compound of part (a), M.P. 134–135° C., resolidified, then M.P. 147–148° C., $[\alpha]_D^{27}=+57.4°$ (1% in chloroform).

*Analysis.*—Calcd. for $C_{22}H_{34}O_4$: C, 72.87; H, 9.45. Found: C, 72.87; H, 9.70.

When the chromatographic column in part (c) above was eluted with benzene, the eluates when concentrated to dryness provided crystalline material of M.P. 209–216° C. The latter material when recrystallized twice from benzene gave 3α-acetoxy-D-homoetiocholane-11β,17aβ-diol, M.P. 217–218.5° C. (corr.), $[\alpha]_D^{25}=+56.5°$ (1% in chloroform).

*Analysis.*—Calcd. for $C_{22}H_{36}O_4$: C, 72.48; H, 9.96. Found: C, 72.70; H, 9.98.

The structure was proven by oxidation with chromic acid to 3α-acetoxy - D - homoetiocholane-11,17a-dione (Example 2c) and acetylation to give 3α,17aβ-diacetoxy-D-homoetiocholan-11β-ol (Example 7b).

(d) *D-Homoetiocholane-3α,17aα-Diol-11-One*

(V, R is H)

About 100 mg. of the 3α-acetoxy-D-homoetiocholan-11-on-17aα-ol prepared in part (c) above was refluxed with 25 ml. of methanol and 0.5 g. of potassium hydroxide for one hour. The reaction mixture was poured into 200 ml. of water, and after cooling for four hours a crystalline solid began to separate. The latter was collected by filtration, washed with water and recrystallized from petroleum ether (Skellysolve C) to give D-homoetiocholane-3α,17aα-diol-11-one as flat rectangular plates, M.P. 181.5–184.5° C. (corr.).

*Analysis.*—Calcd. for $C_{20}H_{32}O_3$: C, 74.95; H, 10.07. Found: C, 74.44; H, 9.94.

EXAMPLE 6

(a) *3α-Acetoxy-17aβ-Benzoyloxy-D-Homoetiocholan-11-One*

(VII)

Benzoyl chloride (33.4 g.) was added dropwise under anhydrous conditions over a period of about ten minutes to a solution of 17 g. of 3α-acetoxy-D-homoetiocholan-17aβ-ol-11-one (prepared as described in Example 5, part (a)) in 150 ml. of pyridine at 0° C. The reaction mixture was maintained at 0–5° C. for two hours after the addition of the benzoyl chloride was complete and allowed to stand at room temperature for about fifteen hours. Water (18 ml.) was then added dropwise, and the mixture was stirred for four hours at room temperature and then poured into 2 liters of water. The oil which separated crystallized slowly and this was collected by filtration, washed with water, stirred with aqueous sodium bicarbonate solution for forty-five minutes, again collected by filtration, washed with water and dried. The resulting 21.6 g. of cream-colored solid was recrystallized from petroleum ether (Skellysolve C) to give 18 g. of 3α-acetoxy-17aβ-benzoyloxy-D-homoetiocholan-11-one, M.P. 172–174° C. Further recrystallization gave a sample melting at 180–182° C. (corr.), $[\alpha]_D^{25}=+106.0°$ (1% in chloroform).

*Analysis.*—Calcd. for $C_{29}H_{38}O_5$: C, 74.64; H, 8.21. Found: C, 74.57; H, 8.00.

(b) *17aβ-Benzoyloxy-D-Homoetiocholan-3α-Ol-11-One*

(VIII)

A solution of 0.65 g. of potassium bicarbonate in 30 cc. of water was added to a hot solution of 2.5 g. of 3α-acetoxy - 17aβ - benzoyloxy-D-homoetiocholan-11-one in 120 ml. of methanol. The mixture was refluxed for two hours and twenty minutes and then neutralized with 0.55 ml. of concentrated hydrochloric acid diluted with water. Most of the methanol was removed in vacuo and the residual material was diluted with water and the solid present was collected by filtration, washed with water and dried giving 2.0 g. of 17aβ-benzoyloxy-D-homoetiocholan-3α-ol-11-one, M.P. 191–194° C. This substance was further purified by dissolving it in ethyl acetate, filtering off a small amount of insoluble material, concentrating the filtrate to a small volume and diluting with petroleum ether (Skellysolve B). In this way a sample melting at 203–205° C. (corr.) was obtained, $[\alpha]_D^{25}=+81.8°$ (1% in chloroform).

*Analysis.*—Calcd. for $C_{27}H_{36}O_4$: C, 76.38; H, 8.55. Found: C, 76.31; H, 8.36.

(c) *17aβ-Benzoyloxy-D-Homoetiocholane-3,11-Dione*

(IX)

A solution of 5.0 g. of chromic oxide in 50 ml. of acetic acid and 10 ml. of water was added to a solution of 19.4 g. of 17aβ-benzoyloxy - D - homoetiocholan-3α-ol-11-one in 450 ml. of acetic acid and the mixture was allowed to stand at room temperature for twenty hours. Methanol (50 ml.) was then added and after one-half hour the mixture was evaporated nearly to dryness in vacuo. The residual material was treated with diluted hydrochloric acid and a 1:2 mixture of chloroform and ether. The organic layer was separated, washed with water and sodium bicarbonate solution and dried over anhydrous sodium sulfate. The organic extracts were concentrated to a volume of about 40 ml., 75 ml. of ethyl acetate was added, the solution again concentrated to about 40 ml., 75 ml. of petroleum ether (Skellysolve C) was added and the solution again concentrated to about 50 ml. at which point a crystalline solid separated. The mixture was cooled to 0° for about fifteen hours and the solid was collected by filtration and washed with petroleum ether giving 15.6 g. of 17aβ-benzoyloxy-D-homoetiocholane-3,11-dione, M.P. 196–197° C. A sample recrystallized successively from ethyl acetate, acetone and methanol had the M.P. 198.5–202° C. (corr.), $[\alpha]_D^{25}=+95.2°$ (1% in chloroform).

*Analysis.*—Calcd. for $C_{27}H_{34}O_4$: C, 76.74; H, 8.11. Found: C, 76.96; H, 8.20.

(d) *D-Homoetiocholan-17aβ-Ol-3,11-Dione*

(X)

A solution of 1.0 g. of potassium carbonate in 10 cc. of hot water was added to a solution of 0.5 g. of 17aβ-benzyloxy-D-homoetiocholane-3,11-dione in 50 cc. of refluxing methanol. The mixture was refluxed for two hours, the methanol removed under reduced pressure and the residue diluted with water. The resulting solid was collected by filtration, washed with water, dried and recrystallized twice from benzene to give D-homoetiocholan-17aβ-ol-3,11-dione, M.P. 243–245° C., $[\alpha]_D^{25}=+58.4°$ (1% in chloroform).

*Analysis.*—Calcd. for $C_{20}H_{30}O_3$: C, 75.43; H, 9.50. Found: C, 75.42; H, 9.60.

EXAMPLE 7

(a) *D-Homoetiocholane-3α,11β,17aβ-Triol*

(VI; R, R' are H)

A solution of 3.6 g. of the 3α-acetoxy-D-homoetiocholan-17aβ-ol-11-one obtained in Example 5, part (a) in 100 ml. of dry benzene and 150 ml. of dry ether was gradually added to a suspension of 1.52 g. of lithium aluminum hydride in 150 ml. of dry ether. The reaction mixture was stirred and refluxed for one and one-half hours in a nitrogen atmosphere. Water (55 ml.) was cautiously added, the mixture was stirred for ten minutes and the organic solvents were removed in vacuo. The residue was cooled in ice, and dilute sulfuric acid equivalent to 5 ml. of concentrated acid was added. The organic material was extracted with ethyl acetate, the ethyl acetate was washed with water and with sodium bicarbonate solution, dried over anhydrous sodium sulfate and concentrated to a volume of about 10 ml. Petroleum ether (50 ml., Skellysolve B) was added, and the resulting solid which separated was collected by filtration, washed with petroleum ether and dried at 70° C. to give 4.0 g. of D-homoetiocholane-3α,11β,17aβ-triol, M.P. 188–195° C. with sintering at 132° C. When recrystallized from ethyl acetate and then from acetone, a sample melting at 204.5–208° C. (corr.) was obtained, $[\alpha]_D^{25}=+38.6°$ (1% in chloroform).

*Analysis.*—Calcd. for $C_{20}H_{34}O_3$: C, 74.49; H, 10.63. Found: C, 74.49; H, 10.94.

(b) *3α,17aβ-Diacetoxy-D-Homoetiocholan-11β-ol*

(VI; R, R' are COCH₃)

A solution of 0.5 g. of D-homoetiocholane-3α,11β,17aβ-triol in 10 ml. of pyridine and 10 ml. of 90–95% acetic anhydride was heated on a steam bath for one hour. The mixture was then poured into ice-water, and the resulting solid was collected by filtration, dried and recrystallized first from ethyl acetate and then from methanol, giving 3α,17aβ-diacetoxy-D-homoetiocholan-11β-ol, M.P. 252–255° C. (corr.), $[\alpha]_D^{25}=+42.7°$ (1% in chloroform).

By substitution in the foregoing preparation of the acetic anhydride by a molar equivalent amount of propionic anhydride, butyric anhydride, succinic anhydride, benzoyl chloride, p-nitrobenzoyl chloride, p-toluyl chloride, m-methoxybenzoyl chloride, or o-chlorobenzoyl chloride, there can be obtained, respectively, 3α,17aβ-dipropionoxy-D-homoetiocholan-11β-ol (VI; R, R' are COCH₂CH₃); 3α,17aβ-dibutyroxy-D-homoetiocholan-11β-ol (VI; R, R' are COCH₂CH₂CH₃); 3α,17aβ-di(β-carboxypropionoxy)-D-homoetiocholan-11β-ol (VI; R, R' are COCH₂CH₂COOH); 3α,17aβ-dibenzoyloxy-D-homoetiocholan-11β-ol (VI; R, R' are COC₆H₅); 3α,17aβ-di(p-nitrobenzoyloxy)-D-homoetiocholan-11β-ol (VI; R, R' are COC₆H₄NO₂-p); 3α,17aβ-di(p-toluyloxy)-D-homoetiocholan-11β-ol (VI; R, R' are COC₆H₄CH₃-p); 3α,17aβ-di(m-methoxybenzoyloxy)-D-homoetiocholan-11β-ol (VI; R, R' are COC₆H₄OCH₃-m); or 3α,17aβ-di(o-chlorobenzoyloxy)-D-homoetiocholan-11β-ol (VI; R, R' are COC₆H₄Cl-o).

EXAMPLE 8

(a) *3α-Acetoxy-D-Homoetiocholane-11,17a-Dione 17a-Ethylenehemithioketal*

(XI; R is Acetyl)

3α-acetoxy-D-homoetiocholane-11,17a-dione (7.2 g.) was dissolved in 25 ml. of dioxane by heating. The solution was cooled to about 15° C. and 7.8 g. of freshly distilled beta-mercaptoethanol and 10 g. of anhydrous sodium sulfate were added. The mixture was then cooled to 0° C. and 10 g. of freshly fused zinc chloride was added. After standing for five hours with occasional shaking, water was added and the mixture extracted with chloroform. The chloroform extracts were dried over anhydrous sodium sulfate and concentrated to dryness. The residue was treated with petroleum ether (Skellysolve B) and the resulting crystalline solid collected by filtration, giving 5.0 g., M.P. 195–205° C. This product was dissolved in 50 ml. of hot ethyl acetate; upon cooling a gelatinous white precipitate appeared which was removed by filtration. The filtrate was concentrated to dryness and the residue recrystallized from methanol containing a few drops of pyridine, giving 3.0 g. of 3α-acetoxy-D-homoetiocholane-11,17a-dione 17a-ethylenehemithioketal. Another recrystallization gave a sample melting at 229–236° C. (corr.), $[\alpha]_D^{25}=+51.5°$ (1% in chloroform).

*Analysis.*—Calcd. for $C_{24}H_{36}O_4S$: C, 68.53; H, 8.63; S, 7.62. Found: C, 68.10; H, 8.34; S, 7.62.

(b) *D-Homoetiocholane-3α,11β-Diol-17a-One 17a-Ethylenehemithioketal*

(XII; R is H)

A suspension of 1.52 g. of lithium aluminum hydride in 200 ml. of anhydrous ether was stirred for one-half hour in a nitrogen atmosphere, and 4.2 g. of 3α-acetoxy-D-homoetiocholane-11,17a-dione 17a-ethylenehemithioketal dissolved in 50 ml. of benzene and 50 ml. of ether was added dropwise over a period of fifteen minutes. The mixture was then refluxed with stirring for three hours and allowed to stand overnight. Water was then carefully added with cooling followed by 15 ml. of 6 N sulfuric acid. The mixture was stirred until all precipitates had dissolved, and the ether layer was separated and washed with water and sodium bicarbonate solution. The extracts were dried over anhydrous sodium sulfate and concentrated to dryness giving 4.0 g. of D-homoetiocholane-3α,11β-diol-17a-one 17a-ethylenehemithioketal, M.P. 196–202° C. Recrystallization first from an ethyl acetate-petroleum ether (Skellysolve C) mixture and then from ethyl acetate alone gave a sample melting at 207–208° C. (corr.), $[\alpha]_D^{25}=+32.38°$ (1% in chloroform).

*Analysis.*—Calcd. for $C_{22}H_{36}O_3S$: C, 69.42; H, 9.53; S, 8.43. Found: C, 69.80; H, 10.00; S, 8.17.

(c) *D-Homoetiocholane-3α,11β-Diol-17a-One*

(XIII; R is H)

A mixture of about 4 g. of D-homoetiocholane-3α,11β-diol-17a-one 17a-ethylenehemithioketal, 15 g. of Raney nickel and 300 ml. of acetone was refluxed for thirty hours. The mixture was then filtered and the filtrate evaporated to dryness in vacuo. The residue was crystallized from an ethyl acetate-petroleum ether (Skellysolve C) mixture, and recrystallized from the same solvent, giving D-homoetiocholane-3α,11β-diol-17a-one, M.P. 160–162° C., with sintering at 156° C.

(d) 3α-Acetoxy-D-Homoetiocholan-11β-Ol-17a-One (XIII; R is CH₃CO)

A mixture of about 10 g. of D-homoetiocholane-3α,11β-diol-17a-one, 20 cc. of pyridine and 10 cc. of acetic anhydride was heated on a steam bath for one hour, then cooled and poured into 1 liter of water. The solid product was collected by filtration, washed with water and dried at 70° C., giving 11.0 g., M.P. 133–137° C. After several recrystallizations from dilute methanol there was obtained a sample of 3α-acetoxy-D-homoetiocholan-11β-ol-17α-one, having the M.P. 164–165.5° C. (corr.), $[\alpha]_D^{25} = +14.5°$ (1% in chloroform).

Analysis.—Calcd. for $C_{22}H_{34}O_4$: C, 72.89; H, 9.45. Found: C, 73.08; H, 9.65.

EXAMPLE 9

D-Homoetiocholane-3α,11α,17aβ-Triol (VI; R, R' are H)

Sodium metal (23 g.) was added as rapidly as possible to a hot solution of 2.3 g. of D-homoetiocholane-3α,17aβ-diol-11-one, obtained as described above in Example 5, part (d), in 250 ml. of n-propanol. The reaction mixture was refluxed for about forty minutes, then cooled, and 200 ml. of methanol was cautiously added to remove the excess sodium. Water (250 ml.) was then added, and the organic solvents were removed in vacuo. The solid material was collected by filtration (2.2 g., M.P. 233–240° C.), and recrystallized first from a methanol-ethyl acetate mixture and then from dilute ethanol. The product was dried for eight hours at 110° C. in vacuo, giving D-homoetiocholane-3α,11α,17aβ-triol, M.P. 241.5–243° C. (corr.), $[\alpha]_D^{25} = -0.54°$ (1% in dioxane).

Analysis.—Calcd. for $C_{20}H_{34}O_3$: C, 74.49; H, 10.63. Found: C, 74.80; H, 10.32.

EXAMPLE 10

(a) 3α-Acetoxy-D-Homoetiocholane-11,17a-Dione 17a-Ethylene Glycol Ketal

A mixture of 25.0 g. of 3α-acetoxy-D-homoetiocholane-11,17a-dione, prepared as described above in Example 2, part (c), 25.0 ml. of freshly distilled ethylene glycol, 1.0 g. of p-toluenesulfonic acid monohydrate and 500 ml. of benzene was refluxed under a water trap for seven and one-half hours, and then kept at room temperature for about fifteen hours. Pyridine (2 ml.) was then added, and the benzene solution was washed twice with water, and dried over anhydrous sodium sulfate and concentrated in vacuo. The residue was recrystallized first from petroleum ether (Skellysolve C) and then from 400 ml. of methanol containing four drops of pyridine, giving 3α-acetoxy - D - homoetiocholane-11,17a-dione 17a-ethylene glycol ketal in two crops, 13.6 g., M.P. 208–210° C. and 3.8 g., M.P. 197–200° C.

(b) 3α,11α-Diacetoxy-D-Homoetiocholan-17a-One 17a-Ethylene Glycol Ketal

The combined crops of 3α-acetoxy-D-homoetiocholane-11,17a-dione 17a-ethylene glycol ketal (17.4 g.), obtained in part (a) above, was reduced with 184 g. of sodium in 2000 ml. of n-propanol according to the manipulative procedure described above in Example 9. The crude product was extracted with methylene chloride, and the extracts were dried over anhydrous sodium sulfate and concentrated in vacuo. The residue was dissolved in 150 ml. of anhydrous pyridine and 100 ml. of 90–95% acetic anhydride, and the solution was then heated on a steam bath for one hour. The reaction mixture was concentrated in vacuo to a volume of 25 ml., 25 ml. of pyridine was added, and the mixture was then added to ice water. The solid material was collected by filtration, dried and recrystallized twice from absolute ethanol containing a few drops of pyridine giving 14.0 g. of 3α,11α-diacetoxy-D-homoetiocholan-17a-one 17a-ethylene glycol ketal, M.P. 206–208° C.

(c) 3α,11α-Diacetoxy-D-Homoetiocholan-17a-One

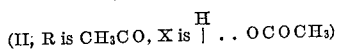
(II; R is CH₃CO, X is |  . . OCOCH₃)

A solution of 14.0 g. of 3α,11α-diacetoxy-D-homoetiocholan-17a-one 17a-ethylene glycol ketal in 100 ml. of 80% acetic acid was heated on a steam bath for one and one-half hours. The reaction mixture was added to 1 liter of water, and the solid product was collected by filtration, giving 12.6 g., M.P. 157–164° C. The latter was recrystallized from 75 ml. of absolute ethanol and dried at 70° C., giving 6.6 g. of 3α,11α-diacetoxy-D-homoetiocholan-17a-one, M.P. 171–173° C.

(d) 11α-Acetoxy-D-Homoetiocholan-3α-Ol-17a-One

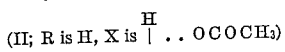
(II; R is H, X is |  . . OCOCH₃)

A mixture of about 20 g. of 3α,11α-diacetoxy-D-homoetiocholan-17a-one, 9.0 g. of potassium carbonate, 300 ml. of methanol and 50 ml. of water was refluxed on a steam bath for one hour. The reaction mixture was concentrated in vacuo, water was added, and the solid product was collected by filtration, giving 14.3 g., M.P. 153–160° C. The latter product was recrystallized twice from ethyl acetate and dried for eight hours at 110° C. in vacuo, giving 11α-acetoxy-D-homoetiocholan-3α-ol-17a-one, M. P. 167–168.5° C. (corr.), $[\alpha]_D^{25} = -70.9°$ (1% in chloroform).

Analysis.—Calcd. for $C_{22}H_{34}O_4$: C, 72.87; H, 9.45. Found: C, 72.94; H, 9.31.

EXAMPLE 11

(a) 4-Bromo-D-Homoetiocholane-3,11,17a-Trione (XX; X', X" are O)

D-homoetiocholane-3,11,17a-trione (12.235 g., prepared as described above in Example 4) was dissolved in 150 ml. of acetic acid, and 0.2 ml. of 30% hydrogen bromide in acetic acid was added. A solution of 14.20 g. of pyridinium bromide perbromide and 5.16 g. of sodium acetate tetrahydrate in 100 ml. of acetic acid was then added dropwise with stirring and heating. After the addition was complete, the reaction mixture was added to two liters of water, and the solid material was collected by filtration, and dried at 40° C., giving 13.4 g. of 4-bromo-D-homoetiocholane-3,11,17a-trione, M.P. 188–190° C. (dec.). A sample when recrystallized from acetone had the M.P. 204–206° C.

(b) D-Homo-4-Androstene-3,11,17a-Trione (XXI; X', X" are O)

A mixture of 3.16 g. of 4-bromo-D-homoetiocholane-3,11,17a-trione and 1.02 g. of anhydrous lithium chloride in 40 ml. of dimethylformamide was heated with stirring on a steam bath for two hours under a nitrogen atmosphere. The reaction mixture was diluted with an equal volume of water and cooled in a refrigerator. The solid product was collected by filtration, recrystallized from ethyl acetate and dried over phosphorus pentoxide at 50° C. for fifteen hours in vacuo and then at 110° C. for seven hours, giving D-homo-4-androstene-3,11,17a-trione, M.P. 207–209° C. (corr.), $$[\alpha]_D^{23.8} = +140.7° \pm 0.6°$$

(1% in chloroform).

Analysis.—Calcd. for $C_{20}H_{26}O_3$: C, 76.40; H, 8.34. Found: C, 76.33; H, 8.32.

By substitution in the preceding example of the D-homoetiocholane-3,11,17a-trione by an equal quantity of D-homoetiocholan-17aβ-ol-3,11-dione (Example 6, part (d)) there can be obtained D-homo-4-androsten-17aβ-ol-3,11-dione (XXI; X' is O, X" is

—OH)

EXAMPLE 12

D-Homoandrostane-3,11,17a-Trione
(XXII; X', X" are O)

A solution of 6.0 g. of D-homo-4-androstene-3,11,17a-trione, M.P. 195–204° C., in 200 ml. of absolute ethanol was hydrogenated in the presence of 0.5 g. of 22% palladium hydroxide on strontium carbonate catalyst at 29–30° C. and an initial hydrogen pressure of 31.9 lbs. per sq. inch. After twenty-five minutes the reduction was complete, the catalyst was removed by filtration and the filtrate concentrated in vacuo. The residue was dissolved in 100 ml. of acetone and 20 ml. of water, 2 g. of N-bromoacetamide was added and the mixture was kept at 0° C. for twelve hours. Zinc dust (5 g.) was then added, and the mixture was stirred for fifteen minutes and filtered. The filtrate was concentrated, the residue was washed with water and the solid material collected by filtration. The latter was recrystallized successively from acetone, ethyl acetate, and absolute ethanol, and dried over phosphorus pentoxide for twenty-four hours at room temperature and then for seven hours at 110° C. in vacuo (1.5 mm.), giving D-homoandrostane-3,11,17a-trione, M.P. 219.5–226.5° C. (corr.), $[\alpha]_D^{24} = 0°$ (1% in chloroform). This compound is isomeric with the compound of Example 4, differing in the stereochemical nature of the junction of rings A and B.

*Analysis.*—Calcd. for $C_{20}H_{28}O_3$: C, 75.91; H, 8.92. Found: C, 75.92; H, 8.90.

EXAMPLE 13

3α-Acetoxy-D-Bishomoetiocholane-11,17b-Dione (A; X is $\overset{H}{|}$ .. OCOCH₃, X', X" are O, n is 2)

A mixture of 3.60 g. of 3α-acetoxy-D-homoetiocholane-11,17a-dione, prepared as described above in Example 2, part (c) and 10 cc. of acetone cyanohydrin was heated briefly on a steam bath until solution was complete. The reaction mixture was allowed to stand for fifteen hours at room temperature, 200 cc. of water was then added, and the crystalline material which formed was collected by filtration, giving 3.885 g. of 3α-acetoxy-17a-cyano-D-homoetiocholan-17a-ol-11-one.

The 3α-acetoxy-17a-cyano-D-homoetiocholan-17a-ol-11-one was hydrogenated with 1.0 g. of platinum oxide catalyst and 200 cc. of acetic acid according to the manipulative procedure described above in Example 1, part (b). The 3α-acetoxy-17a-aminomethyl-D-homoetiocholan-17a-ol-11-one thus obtained was reacted with 1.38 g. of sodium nitrite and 2 cc. of acetic acid in 200 cc. of water according to the manipulative procedure described above in Example 1, part (c). The product separated as a solid from the reaction mixture, and it was collected by filtration and washed with water, giving 3.485 g., M.P. 135—144° C. After three recrystallizations from methanol there was obtained a sample of 3α-acetoxy-D-bishomoetiocholane-11,17b-dione, M.P. 174.5–175.5° C. (corr.), $[\alpha]_D^{25} = +16.9°$ (1% in chloroform).

*Analysis.*—Calcd. for $C_{23}H_{34}O_4$: C, 73.76; H, 9.15. Found: C, 75.40; H, 9.27.

By substituting 3α-acetoxy-D-bishomoetiocholane-11,17b-dione for the 3α-acetoxy-D-homoetiocholane-11,17a-dione in Example 3(d) and carrying the resulting D-bishomoetiocholan-3α-ol-11,17b-dione (A; X is $\overset{H}{|}$ .. OH, X', X" are O, n is 2)

or its 3-acetate through the manipulative procedures of Examples 4, 5, 6, 7 and 8, there can be obtained D-bishomoetiocholane-3,11,17b-trione (A; X, X', X" are O, n is 2), D-bishomoetiocholane-3α1-7bβ-diol-11-one (A; X is $\overset{H}{|}$ .. OH, X' is O, X" is $\overset{H}{:}$ —OH, n is 2)

D-bishomoetiocholan-17bβ-ol-3,11-dione (A; X is O, X' is O, X" is $\overset{H}{:}$ —OH, n is 2)

D-bishomoetiochlolane-3α,11β,17bβ-triol (A; X is $\overset{H}{|}$ .. OH, X' is $\overset{H}{:}$ —OH, X" is $\overset{H}{:}$ —OH, n is 2)

and D-bishomoetiocholane-3α,11β-diol-17b-one (A; X is $\overset{H}{|}$ .. OH, X' is $\overset{H}{:}$ —OH, X" is O, n is 2).

The compounds of Formula A have been found to possess hormone-inhibitory properties when tested in experimental animals, which indicates their usefulness in combatting pathological conditions brought about by endocrine imbalance in the animal organism. For example, D-homoetiocholan-3α-ol-11,17a-dione (Example 1) was found to exhibit 35.7% inhibition of estrogen at a dose of 5.0 mg./kg. of body weight per day over a period of three days when measured in female rats by determining the weight of the uteri of the animals injected with the new compound as compared with the weight of the uteri of animals injected only with the standard dose of estradiol. D-homoetiocholane-3α,11α,17aβ-triol (Example 9), at a dose level of 14 mg./kg., exhibited appreciable inhibitory effects against cortisone in adrenalectomized rats as measured by the liver glycogen deposition test. 11α-acetoxy-D-homoetiocholan-3α-ol-17a-one (Example 10) was found to exhibit 39% inhibition of androgens at a dose level of 20 mg./kg./day. 3α-acetoxy-D-bishomoetiocholane-11,17b-dione (Example 13) was found to exhibit 30.7% inhibition of estrogen at a dose level of 5 mg./kg./day. D - homo - 4-androstene-3,11,17a-trione (Example 11) and D-homoandrostane-3,11,17a-trione (Example 12) were found to possess a pituitary inhibitory potency about equal to that of testosterone when measured by the testicular weight changes in immature male rates, and they posses androgenic activity, although significantly less than that of testosterone; this is an advantage since it indicates that pituitary inhibition may be effected without simultaneously introducing undesirable masculinizing side-effects.

The compounds of Formula A can be prepared for use by dissolving them in a therapeutically acceptable oil or oil-water emulsion for parenteral administration, in the same way that conventional steroidal hormones are formulated.

The compounds of Formula A are also useful as intermediates in the preparation of other useful compounds. The compounds having a keto group in the 17a-position can be reacted with alkali metal acetylides to give the 17a-ethynyl-17a-hydroxy compounds which possess estrogen inhibitory properties. The latter are described in my copending application Serial No. 475,810, filed December 16, 1954, now U.S. Patent 2,822,382. The said 17a-ethynyl-17a-hydroxy compounds are in turn useful as intermediates in the preparation of analogous compounds having the typical cortical hormone side chain, i.e., —COCH₂OH, and having that activity, as disclosed in my copending application, Serial No. 463,055, filed October 18, 1954, now U.S. Patent 2,860,158.

This application is a division of my copending application, Serial No. 557,433, filed January 5, 1956, now U.S. Patent 2,880,233, which is in turn a continuation-in-part of my copending application, Serial No. 333,615, filed January 27, 1953, now abandoned.

I claim:

1. A compound having the formula

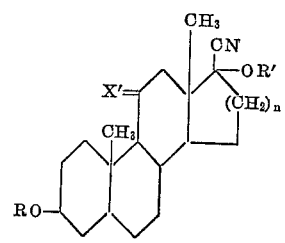

wherein X′ is selected from the group consisting of =O and

R and R′ are selected from the class consisting of hydrogen and carboxylic acyl groups having a molecular weight less than about 250, and $n$ is an integer from 1 to 2.

2. 17-cyanoetiocholane-3α,17-diol-11-one.
3. 3α-acetoxy-17-cyanoetiocholan-17-ol-11-one.
4. 3α-acetoxy-17a-cyano-D - homoetiocholan - 17a-ol-11-one.
5. 3α,17-diacetoxy-17-cyanoetiocholan-11-one.
6. A compound having the formula

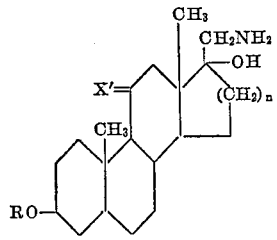

wherein X′ is selected from the group consisting of =O and

R is selected from the class consisting of hydrogen and carboxylic acyl groups having a molecular weight less than about 250, and $n$ is an integer from 1 to 2.

7. 17-aminomethyletiocholane-3α,17-diol-11-one.
8. 3α-acetoxy-17 - aminomethyletiocholan - 17 - ol-11-one.
9. 3α-acetoxy-17a-aminomethyl - D - homoetiocholan-17a-ol-11-one.

References Cited in the file of this patent

UNITED STATES PATENTS

| | | |
|---|---|---|
| 2,136,401 | Strassberger | Nov. 15, 1938 |
| 2,324,881 | Ruzicka et al. | July 20, 1943 |
| 2,326,756 | Butenandt | Aug. 17, 1943 |
| 2,351,637 | Ruzicka et al. | June 20, 1944 |
| 2,734,066 | Ercoli et al. | Feb. 7, 1956 |
| 2,742,485 | Ercoli et al. | Apr. 17, 1956 |
| 2,880,233 | Clinton | Mar. 31, 1959 |

OTHER REFERENCES

Fieser and Fieser: Natural Products Related to Phenanthrene, 3rd edition, 1949, page 379, Reinhold Pub. Corp., New York.

Royals: Advanced Organic Chemistry, Prentice-Hall, Inc., N.J., March 1954, pages 226–230.

UNITED STATES PATENT OFFICE
CERTIFICATE OF CORRECTION

Patent No. 3,055,921            September 25, 1962

Raymond O. Clinton

It is hereby certified that error appears in the above numbered patent requiring correction and that the said Letters Patent should read as corrected below.

Column 1, line 56, for "capropyl" read -- caproyl --; column 4, lines 66 to 75, the formula should appear as shown below instead of as in the patent:

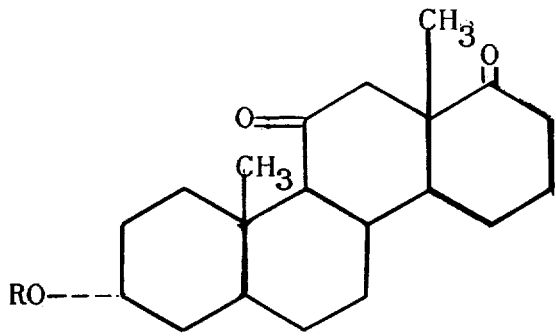

column 5, lines 25 to 35, formula XIII should appear as shown below instead of as in the patent:

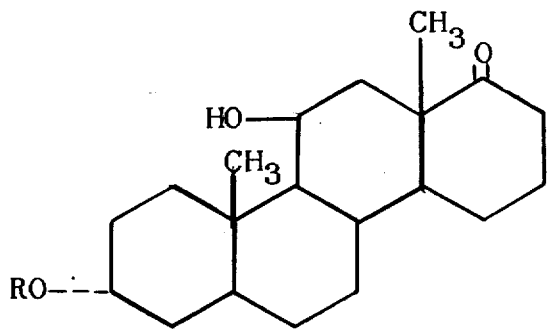

3,055,921 same column 5, lines 64 to 75, formula XV should appear as shown below instead of as in the patent:

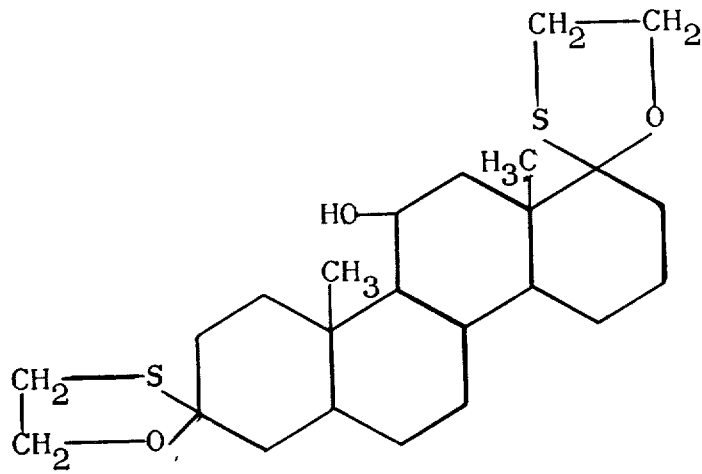

column 13, line 11, for "benzyloxy-" read -- benzoyloxy- --; column 15, line 12, for "-17α-one" read -- -17a-one --; column 17, line 70, for "-3α1-7bβ-" read -- -3α,17bβ- --.

Signed and sealed this 6th day of August 1963.

(SEAL)
Attest:

ERNEST W. SWIDER
Attesting Officer

DAVID L. LADD
Commissioner of Patents